United States Patent Office 3,354,114
Patented Nov. 21, 1967

3,354,114
POLYSTYRENE FIBER-FINELY DIVIDED SILICA THICKENING AGENT, AND ORGANIC LIQUID MATERIALS THICKENED THEREWITH
Carroll Francis Doyle, Ellicott City, Md., assignor to W. R. Grace & Co., New York, N.Y., a corporation of Connecticut
No Drawing. Filed Mar. 3, 1964, Ser. No. 349,134
12 Claims. (Cl. 260—40)

ABSTRACT OF THE DISCLOSURE

Thickening of polyesters and polyepoxy resins with an intimate mixture of finely divided fibers of polystyrene and fine sized silica. The mixture is prepared by simultaneously feeding oriented expanded polystyrene and silica into a fluid energy mill.

---

This invention relates to thickening agents. In one specific aspect it relates to the use of finely divided solid materials as thickening agents.

A wide variety of materials have been used to increase the viscosity of paints, various emulsions, and numerous molding compositions to permit better applicability, to smooth the flow rates and the like. Such materials, which will be called "thickeners" herein, include fine-sized silicas and siliceous compositions, for example clays, casein and soya proteins, methyl cellulose, sodium carboxymethyl cellulose, various alginates such as ammonium alginate, and various polyacrylates such as alkali metal and ammonium polyacrylates. There is currently a wide demand for other materials which will provide better thickening ability (i.e., which will give greater viscosity increase) when used in the same or smaller proportions than the known thickeners.

It is a principal object of this invention to provide a method for thickening plastisols, organosols, synthetic and natural resin latices, paints, liquid polyesters, liquid polyepoxides, and other like materials by incorporation therein of finely divided solid materials as thickening agents.

This and other objects of the invention will become apparent from the following detailed description and specific examples.

This invention contemplates the use of finely divided fibers of polystyrene as thickening agents. Another aspect of the invention is the use of an intimate mixture of finely divided fibers of polystyrene and fine size silica as thickening agents.

The polystyrene fibers used in this invention consists of finely divided fibers of oriented, expanded polystyrene. These fibers have a major dimension not greater than about 50 microns and usually less than 10 microns. The smallest dimension of the product varies from less than 1 micron to the low millimicron range. Thus the length to diameter ratio of the ultimate particles is always greater than 10 to 1 and greater usually than 500 to 1. The chemical properties of these fine-sized fibers are essentially the same as those of the parent polymer from which they are produced. The apparent density of the intimate mixture of fiber and silica, as best as can be determined is on the order of 1.0 to about 2.0 lbs. per cu. ft. which values give a good indication of its fluffiness, high bulk. The density of the fibrous polystyrene alone is probably about 0.5 lbs. per cu. ft.

The silica of this invention is an aerogel type. The initial particle size is not critical and is limited only by the abilty to feed the silica into the fluid energy mill. The ultimate particle size after grinding in the mill is less than about 10 microns.

The means whereby the fibrous polystyrene and fine size silica are attached are not as yet completely understood. Studies indicate, it is something more than just an electrostatic attraction or mechanical impingement, as the two materials cannot be separated by normal mechanical means. The term "intimate mixture" is used herein in describing this fibrous polystyrene-fine size silica mixture.

The preferred process for making finely divided fibers from the oriented expanded polystyrene comprises providing a moving body of particulate polymer suspended in a gaseous medium at superatmospheric pressure and at a temperature between about 40° and 200° F., continuously introducing additional fluid within said temperature range in a plurality of high velocity streams directed inwardly into said body in a manner to cause extreme turbulence in the mass and resulting attrition and fracturing of the suspended particles, continuously removing the comminuted, fibrous polystyrene from the body along with the gaseous medium, and separating the finely divided fibers from the suspending gas. Suitable apparatus for carrying out the process is known to the art. Such apparatus is commonly known as a fluid energy mill. In this apparatus relatively large particulate material is suspended in a gaseous medium whirling around in an enclosed space and additional gases are introduced into the whirling body in a manner causing turbulence within the body and comminution and fracturing of the particles by attrition. A complete description of such apparatus and its mode of operation can be found in Perry's Chemical Engineer's Handbook, Second Edition (1941), at pages 1930–32, which is incorporated herein in its entirety by reference thereto.

It is a preferred embodiment of this invention that the oriental expanded polystyrene be milled with silica aerogel. The blend of polystyrene and silica can contain from 90 to 10% polystyrene and from 10 to 90% fine-size silica. A preliminary comminution is required to reduce the size of the polystyrene to about 1–2 inches or less, this is required only in order to permit feeding of the polymer to the comminution apparatus. In the operation of the fluid energy mill air is the preferred gaseous suspended medium, and is also preferably used as the supplemental turbulence-creating gas. Suitable pressures of the suspension air range from about 100 to about 500 (preferably about 150 to 300) pounds per square inch gauge, while the auxiliary turbulence creating air is injected into the whirling body of particulate polystyrene and fine-size silica at pressures which can range from about 100 to about 500 pounds per square inch gauge, and preferably are between about 180 and about 200 p.s.i.g. The preferred air temperature is from about 50° to about 100° F. The intimate mixture, finely divided fibers of polystyrene-fine-size silica can be separated from the suspending air in any suitable manner, preferably by use of bag collectors.

The finely divided fibers are useful as heat and sound insulation, fillers, flocculators, as adjuncts in insecticides, for making threads, yarns and other textile-like materials, for solution coating, solution casting or flame spraying, as additives for various synthetic and natural rubbers, resin and rubber latices, etc., as paint additives, as fuel additives or for preparing jellied fuels analogous to rocket fuel, as cement additives, as gas filters, for preparing mats and other like products, as anticaking agents, and for innumerable other purposes.

A particularly efficacious use for these fine-size polystyrene fibers with the silica attached is as a viscosity increasing agent for curable liquid resins (such as polyesters and polyepoxides) and resin latices (such as paints). This intimate mixture of finely divided fibers and fine-size silica is more readily wetted and dispersed and gives much greater increases in viscosity at generally lower concentrations when compared to known commercial thickening agents.

Thixotropically thickened liquid polyester and polyepoxy resins can be prepared by adding to 100 parts of the resin about 0.1 to 5.0 parts of the intimate mixture of fine sized silica and finely divided fibers of polystyrene.

Separate addition of polystyrene fibers and fine-size silica to a resin does not give the equivalent thickening properties as the fluid energy milled intimate mixture.

The invention is illustrated, but not limited by, the following specific examples.

*Example I.—Preparation of finely divided fibers of polystyrene*

Oriented, expanded polystyrene in rod form (5/16-in. dia.) was broken into lengths of 1 to 2 in. or less, and preground in a blender. This was repeated many times to accumulate sufficient material for fluid milling.

The polystyrene from the blender was fed through a Venturi type injector (at 125 p.s.i.g. of compressed air) into a commercially available 8-in. fluid energy mill at rate of about 20 grams per minute. Air at room temperature and under a pressure of about 300 lbs. sq. in. gauge was injected into the whirling body of polystyrene to create a turbulent mass in the mill. The finely divided fibers of polystyrene produced were separated from the air stream in a bag collector. The product was a white, odorless, flocculated powder with a bulk density of about 0.5 lbs. per cu. ft. Photomicrographs of the fibers showed a major dimension not greater than 50 microns and usually less than 10 microns and a smaller dimension of less than 1 micron usually in a low millimicron range.

*Example II.—Preparation of an intimate mixture of fine-size polystyrene fibers and fine-size silica*

Oriented, expanded polystyrene in rod form, (5/16" dia.) was broken into lengths of 1 to 2 in. or less. Ten grams of fine size silica (Syloid 244) and 3.3 grams of broken polystyrene rods were placed in a blender and run at high speed for 3–5 minutes to chop up the expanded polystyrene and mix it with the silica. This chopping and blending operation was repeated many times to accumulate sufficient material for fluid milling.

The mixture from the blender was fed through a Venturi type injector (at 125 p.s.i.g. of compressed air) into a commercially available 8 in. fluid energy mill at a rate of about 20 grams per minute. Air at room temperature and under a pressure of about 300 lbs. sq. in. gauge was injected into the whirling body of polystyrene and fine-size silica to create a turbulent mass in the mill. The finely divided fibers of polystyrene and fine-size silica produced were separated from the air stream in a bag collector. This material was given three passes through the mill. On the second and third passes the air pressure was 250 p.s.i.g.

The mill product was a white, odorless, flocculated powder with a bulk density of 1.4 lbs./cu. ft. This powder consisted of fine size polystyrene fibers intimately mixed with fine size silica. Photomicrographs of the fibers showed a major dimension not greater than 50 microns and usually less than 10 microns and a smaller dimension of less than 1 micron usually in a low millimicron range.

*Example III.—Thickening of polyesters*

The polyester resin used was a commercially available liquid material having a viscosity of 500 centipoises at 77° F. as measured in a Brookfield viscometer using a No. 4 spindle at 6 revolutions per minute. The polyester was admixed with the thickening agent and the increase in viscosity was measured in the same viscometer under the same conditions. Viscosity of the various thickened samples was also determined in the same apparatus at 60 revolutions per minute to determine the thixotropic index of the thickened resin (defined as viscosity at 6 r.p.m. divided by viscosity at 60 r.p.m.).

Agents added were the intimate mixture of finely divided fibers of polystyrene and fine sized silica (as prepared in Example II) and a commercially available thickener consisting of millimicron size silica.

Results are shown in Table I.

TABLE I

[Thickener Concentration 1 phr.] [1]

| Thickener | Brookfield Viscosity No. 4 Spindle, cps., at— | | Thixotropic Index |
|---|---|---|---|
| | 6 r.p.m. | 60 r.p.m. | |
| Intimate mixture of finely divided fibers of polystyrene and fine sized silica | 4,800 | 1,700 | 2.8 |
| Commercial thickener A (millimicron silica) | 2,800 | 1,650 | 1.7 |
| None | 500 | | |

[1] Parts per 100 parts of polyester.

*Example IV.—Thickening of polyepoxides*

The polyepoxide used was a commercially available liquid material having a viscosity of from 400 to 600 centipoises at 77° F., an epoxide equivalent of from 175 to 210 and weighing 9.5 pounds per gallon. The thickening ability of the intimate mixture of finely divided fibers of polystyrene and fine-sized silica, and a commercial thickener consisting of millimicron size silica was compared in the manner described in Example II.

Results are shown in Table II.

TABLE II

[Thickener Concentration 1 phr.] [1]

| Thickener | Brookfield Viscosity No. 4 Spindle, cps., at— | | Thixotropic Index |
|---|---|---|---|
| | 6 r.p.m. | 60 r.p.m. | |
| Intimate mixture of finely divided fibers of polystyrene and fine sized silica | 4,750 | 1,750 | 2.7 |
| Commercial thickener A (millimicron silica) | 800 | 740 | 1.1 |
| None | 400 | | |

[1] Parts per 100 parts of polyepoxide.

*Example V.—Thickening of hydrocarbon fuel*

(A) One hundred gms. of benzene was weighed in an eight ounce glass container. Three grams of the polystyrene silica thickener (prepared as described in Example II) was added to the benzene. The container was closed and vigorously shaken. A thin thixotropic gel formed.

(B) Four additional grams of the polystyrene silica thickener was added to the thixotropic gel of A above. The container was again vigorously shaken, which caused the formation of a thixotropic thick grease-like gel.

What is claimed is:

1. Polystyrene fibers having an ultimate particle size with a major dimension less than about 50 microns and a length to diameter ratio greater than about 500 to 1, said fibers being derived from oriented expanded polystyrene.

2. Polystyrene fibers as defined in claim 1 wherein said major dimension is less than about 10 microns.

3. Method for preparing fibrous polystyrene having a major dimension less than about 10 microns and a length to diameter ratio greater than about 100 to 1 comprising introducing oriented expanded polystyrene into the grinding chamber of a fluid energy mill, comminuting said oriented expanded polystyrene and collecting fine size fibrous polystyrene thereby produced.

4. A composition which consists of an intimate mixture of about 10 to 90% of fine sized silica and from about 90 to 10% finely divided fibers of polystyrene, said polystyrene prepared from oriented expanded polystyrene, said silica having a particle size of less than about 10 microns and said polystyrene fibers having an ultimate particle size with a major dimension less than about 50 microns and a length to diameter ratio greater than about 500 to 1.

5. Composition as defined in claim 1 wherein said fibers have a major dimension less than about 10 microns and a length to diameter ratio greater than about 100 to 1.

6. Process as defined in claim 3 wherein the fibrous polystyrene has a major dimension less than about 50 microns and a length to diameter ratio greater than about 500 to 1.

7. Process as defined in claim 3 wherein the fibrous polystyrene has a major dimension less than about 10 microns and a length to diameter ratio greater than about 100 to 1.

8. A thixotropically thickened composition comprising an organic liquid having incorporated therein about 1 to 7 parts per hundred parts of said organic liquid of a thickening agent comprising an intimate mixture of about 10% to about 90% by weight of fine sized silica aerogel having an average particle size of from about 2 to about 10 microns and from about 90 to 10% by weight of finely divided fiber of oriented, expanded polystyrene having a major dimension less than about 50 microns and a length to diameter ratio greater than about 500 to 1.

9. Method for thixotropically thickening liquid organic materials comprising incorporating therein about 1 to 7 parts per 100 parts of said liquid organic material of a thickening agent, comprising an intimate mixture of about 10% to about 90% by weight of fine sized silica aerogel having an average particle size of from about 2 to about 10 microns and from about 90 to 10% by weight of finely divided fibers of oriented expanded polystyrene having a major dimension less than about 50 microns and a length to diameter ratio greater than about 500 to 1.

10. A method for preparing an intimate mixture of fine sized silica having a particle size less than about 10 microns and fibrous polystyrene having a major dimension of less than about 10 microns at a length to diameter ratio greater than about 100 to 1, said mixture having from about 10 to 90% by weight of said silica and from about 90 to 10% by weight of said polystyrene comprising introducing oriented expanded polystyrene into the grinding chamber of a fluid energy mill, simultaneously introducing into said chamber silica aerogel whereby the said polystyrene is simultaneously comminuted and intimately mixed with the said silica aerogel.

11. Process for thixotropically thickening liquid polyesters which comprises incorporating therein from about 0.1 to about 5.0 parts per hundred parts, by weight, of said polyester of an intimate mixture of fine sized silica having a article size less than about 10 microns and fibrous polystyrene having a major dimension less than about 10 microns in a length to diameter ratio greater than about 100 to 1, said mixture having from about 10 to 90% by weight of said silica and from about 90 to 10% by weight of said polystyrene.

12. Process for thixotropically thickening liquid polyepoxies which comprises incorporating therein from about 0.1 to about 5.0 parts per 100 parts, by weight, of said polyepoxy of an intimate mixture of fine sized silica having a particle size less than about 10 microns and fibrous polystyrene having a major dimension less than about 10 microns and a length to diameter ratio greater than about 100 to 1, said mixture having from about 10 to 90% by weight of said silica and from about 90 to 10% by weight of said polystyrene.

References Cited
UNITED STATES PATENTS

| | | | |
|---|---|---|---|
| 2,743,309 | 4/1956 | Lindsay et al. | 260—40 |
| 2,887,461 | 5/1959 | Hort | 260—40 |
| 3,017,238 | 1/1962 | Levine et al. | 264—176 |
| 3,293,205 | 12/1966 | Doyle et al. | 260—37 |

ALLAN LIEBERMAN, *Primary Examiner.*